United States Patent [19]

Leroy et al.

[11] Patent Number: 5,297,250
[45] Date of Patent: Mar. 22, 1994

[54] METHOD OF GENERATING INTERFACES FOR USE APPLICATIONS THAT ARE DISPLAYABLE ON THE SCREEN OF A DATA PROCESSING SYSTEM, AND APPARATUS FOR PERFORMING THE METHOD

[75] Inventors: Francoise Leroy, Paris; Hervé Lejeune, Boulogne; Pascal Graffion, Elancourt, all of France

[73] Assignee: Bull, S.A., Paris, France

[21] Appl. No.: 827,490

[22] Filed: Jan. 30, 1992

Related U.S. Application Data

[63] Continuation of Ser. No. 526,712, May 22, 1990, abandoned.

[30] Foreign Application Priority Data

May 22, 1989 [FR] France ................. 89 06643

[51] Int. Cl.⁵ .............................................. G06F 15/20
[52] U.S. Cl. ..................................... 395/157; 395/161
[58] Field of Search ............... 395/155, 157, 161, 156, 395/158, 159, 160; 340/747, 750, 798, 799

[56] References Cited

U.S. PATENT DOCUMENTS 4,949,279 8/1990 Takakura et al. ................... 364/518
4,965,741 10/1990 Winchell et al. .................... 364/513

OTHER PUBLICATIONS

Computer, vol. 22, No. 5, May 1989, IEEE, NY, US. T. Lewis et al. "Prototypes from Standard User Interface Management Systems", pp. 51–66.
2nd Int'l. Conf. on Computers and Applications, Peking, Jun. 23–27, 1987, IEEE, NY, US, D. Olsen, Jr., et al., "A Command-Based User Interface Management System" pp. 334–349.

*Primary Examiner*—Phu K. Nguyen
*Attorney, Agent, or Firm*—Kerkam, Stowell, Kondracki & Clarke

[57] ABSTRACT

The method relates to the generation of interfaces that are structured around a window and can be displayed on the screen of a data processing system working in the graphics mode. The method is characterized in that a survey module is associated with the items incorporated in the interface, the module being arranged for displaying, in at least one survey window (16), an instantaneous synoptical table (18, 20) representing the constitution of all or part of the interface and composed on the basis of a descriptive status of the items (22), and that in the interactive mode, the creation and/or modification and/or incorporation of the items (22) is performed with the aid of at least one working window, preferably of the dialog window type, under the instantaneous control of the survey module. The invention also relates to an apparatus for performing this method.

49 Claims, 4 Drawing Sheets

FIG.1

FIG_2

METHOD OF GENERATING INTERFACES FOR USE APPLICATIONS THAT ARE DISPLAYABLE ON THE SCREEN OF A DATA PROCESSING SYSTEM, AND APPARATUS FOR PERFORMING THE METHOD

This is a Continuation, of application Ser. No. 526,712, filed May 22, 1990 now abandoned.

FIELD OF THE INVENTION

The present invention relates to generating interfaces for user applications, such as data banks, office automation applications, or expert programs, that are executed in a data processing system. More particularly, the interface assures the management of the data inputs and outputs used in the user application, for example capturing data from a keyboard or mouse and displaying it on the screen.

BACKGROUND OF THE INVENTION

For some years, it has been a goal to separate the interface module from the body of the user application, essentially to gain flexibility in creation and adaptation. This makes it easier for the interface developer to adapt his program to the hardware as needed, for instance when creating a capture mask or a display mask. The current trend is accordingly to develop interfaces independently of the body of the user application, and to assemble the two programs in the final phase, just before they are executed.

Microsoft has developed a graphics-mode user applications management system called MS-Windows, with which such applications interfaces can be generated by programming and executed. Even though this management system performs well for the end user, access to it is still difficult for the interface developer user, who must be an experienced programmer. In fact, such development cannot be done without learning various programming languages, such as C, beforehand, which is a very long, complicated process.

OBJECT AND SUMMARY OF THE INVENTION

The object of the invention is to permit a developer who is not a specialist to generate interfaces in an interactive mode, practically without having to use programming.

To achieve this, the invention proposes a method of generating interfaces for user applications, each of the interfaces being structured about a window displayable on the screen of a data processing system operating in the graphics mode, the interfaces including visual and/or dynamic items which may or may not be associated with reactions in response to a predefined event, the method being characterized in that:
- a survey module is associated with the items, the module being adapted for displaying, in at least one survey window, an instantaneous synoptical table representing the constitution of all or part of the interface and composed on the basis of a descriptive status of the items present in the interface,
- in the interactive mode, the creation and/or modification and/or incorporation of the items is performed with the aid of at least one working window, preferably of the dialog window type, under the control of the survey module.

Preferably, in the interactive mode, with the aid of at least one working window under the control of the survey module, the creation and/or modification of the specific reactions associated with the dynamic items, hereinafter called Responses, is performed, on the basis of actions predefined inside and/or outside the interface, in the latter case by calling up an identifiable function of the user application.

In a first embodiment of the method according to the invention, the synoptical table is displayed in at least one survey window in the form of at least one list of items, called an Item List, accompanied as applicable by a list of Responses, or Response List, itemizing the Responses associated with the currently selected item in the Item List.

Advantageously, the synoptical table is organized by category (or class) of items in a plurality of Item Lists, each Item List corresponding to a predetermined class and being displayable separately, as application accompanied by its Response List; each Item List and/or Response List, organized by the type of constituent elements of the interface, displays a set of descriptive rubrics for each item and/or component of an item and/or Response. The rubrics are selected in particular from the following: "class/type", "name", "attribute", "item status", and "reference callup", and the contents of the Item Lists and Response Lists and in particular the contents of the descriptive rubrics are updated automatically from the working windows progressively with the operations of creation and/or modification of the interface in the interactive mode.

Thus the method according to the invention enables the creation of interfaces independently of and in the absence of the user application per se. This creation is done in the interactive mode, under the control of a visual survey tool, in which the definition of the interfaces created is visible and modifiable at all times.

The method according to the invention has other important characteristics, which make it possible to provide the developer using the interactive mode with the essential choices available for development in the programmed mode. Among these characteristics, which will be described in detail hereinafter, may be mentioned the pooling of the responses for sequential execution in a list of responses that can be manipulated as a block, for example a list called Initial Status called up during the interface initialization phase, or the use of conditional responses or reference functions for calling up identifiable items. Naturally all these constituent elements of the interface are the subject of encoded display in the synoptical table as soon as they are created.

In another mode of performing the method according to the present invention, the interface to be generated is broken down into basic constituent elements, such as the items and/or their components, by categories of predefined identical structure; the synoptical table is organized in such a manner as to identify each constituent element and/or its category; for at least one category, at least one working window, preferably a dialog window, is defined that can be called up from the survey module, either in the element creation mode after identification of the category in question, or in the display/modification mode after the particular constituent element has been identified.

Advantageously, the working windows are pooled in an editing module controlled by the survey module, and the editing module further includes a module for block information exchange of the constituent elements, of the cut/copy/paste type, that can determine the format of the current block from the identification of the category of the constituent element to be manipulated.

Finally, in another mode of performing the method according to the invention, a test module is associated with the interface, the test module being capable of effecting the display of all or part of the interface and/or of dynamically executing all or part of the interface progressively with its generation in order to display the behavior of the interface and/or of the user application.

Thus the creation or modification of each constituent element (with its internal and external links) is achieved in pin-point fashion from a central observation post, that is, the survey module, but without losing sight of the entire structure of the interface. Moreover, the developer using the interactive mode has the capability of displaying his work as it proceeds and even dynamically testing all or part of the interface, while remaining under the control of the survey module if he wishes. These tests are performed very rapidly, without recourse to compiling and link editing operations.

The invention also relates to an apparatus for performing a method for generating interfaces for applications users that can be displayed on the screen of a data processing system, the apparatus including a data processing system having a central processing unit, a central memory loaded with an operating system program, a screen working in the graphics mode, at least one input peripheral capable of moving a pointer from place to place on the screen, and a set of programs developed in accordance with the specifications defined by the various variants presented herein of the method according to the invention.

Advantageously, the apparatus incorporates a set of programs including an autonomous interface operating module, arranged to be capable of being associated with the generated interface independently of the survey module and if applicable of the editing module, in order to enable the dynamic execution of this interface with a user application.

The method according to the invention will now be described, by way of examples understood not to limit the scope of the invention, with reference to the accompanying drawings, which show partial, schematic views of the screen of a data processing system on which the method of the invention is implemented.

DESCRIPTION OF THE PREFERRED EMBODIMENT

The method according to the invention is preferentially employed with a data processing system that includes at least one central processing unit, a central memory, a screen, a keyboard, and a peripheral input device, such as a mouse, that is capable of positioning a pointer on the screen. The system also includes hardware and/or software for making the screen work in the graphics mode, in particular an operating system program and a graphics environment program.

In all the variants shown hereinafter, the performance of the method according to the invention comprises making the thus-defined data processing system execute a set of defined instruction programs, which are developed to realize at least the following two operations, in the context of generating an interface for a user application structured around a window that can be displayed on the screen and including visual and/or dynamic items:

1) the association of the items with a survey module, arranged to display an instantaneous synoptical table in a survey window, the synoptical table representing the constitution of all or part of the interface and being composed on the basis of a descriptive status of the items incorporated in the interface;

2) the realization, in the interactive mode, of the creation and/or modification and/or incorporation of these items with the aid of at least one working window, preferably of the dialog window type, under the control of the survey module.

Moreover, the data processing system, suitably loaded with this set of programs, hereinafter called the PANORAMA set of development programs, comprises one embodiment of the apparatus capable of performing the method according to the invention, in particular in all of its variants described hereinafter.

It should be noted that the method and/or apparatus according to the invention makes it possible to obtain a certain technical effect, that is, the appearance on the system screen of the survey synoptical table, or of the interactive interface itself, or the physical inscription into the central memory of encoded information in the form of electrical signals, which as a block represent the structural definition of the interactive interface. Naturally the invention is not limited to the particular implementation to be described below; that is, it is not limited in terms of the type of hardware used or the type of operating standards or graphics environment used.

In the present instance, the system uses a BM 40 machine made by Bull S. A., with a minimum memory of 640 kilobytes, connected to a high-resolution graphics screen that preferably supports multiple windows. This system is loaded with a Microsoft MS-DOS operating system accompanied by the MS-Windows graphics environment program (version 2.0) made by the same company, and the set of programs called PANORAMA as defined by the specifications of the present invention.

Generally, the graphics mode requires that a window be defined as a structure that can be represented on the screen by a rectangular frame and is provided with a system of local coordinates (for example horizontal/vertical) and optionally a graphics context (such as the definition of the background, colors and patterns, the definition of the frame, a display title, etc.). In the MS-Windows graphics environment, used as a non-limiting example in the context of performing the method according to the invention, a window includes a frame and a horizontal title bar placed in the upper portion of the frame.

Figure 1:
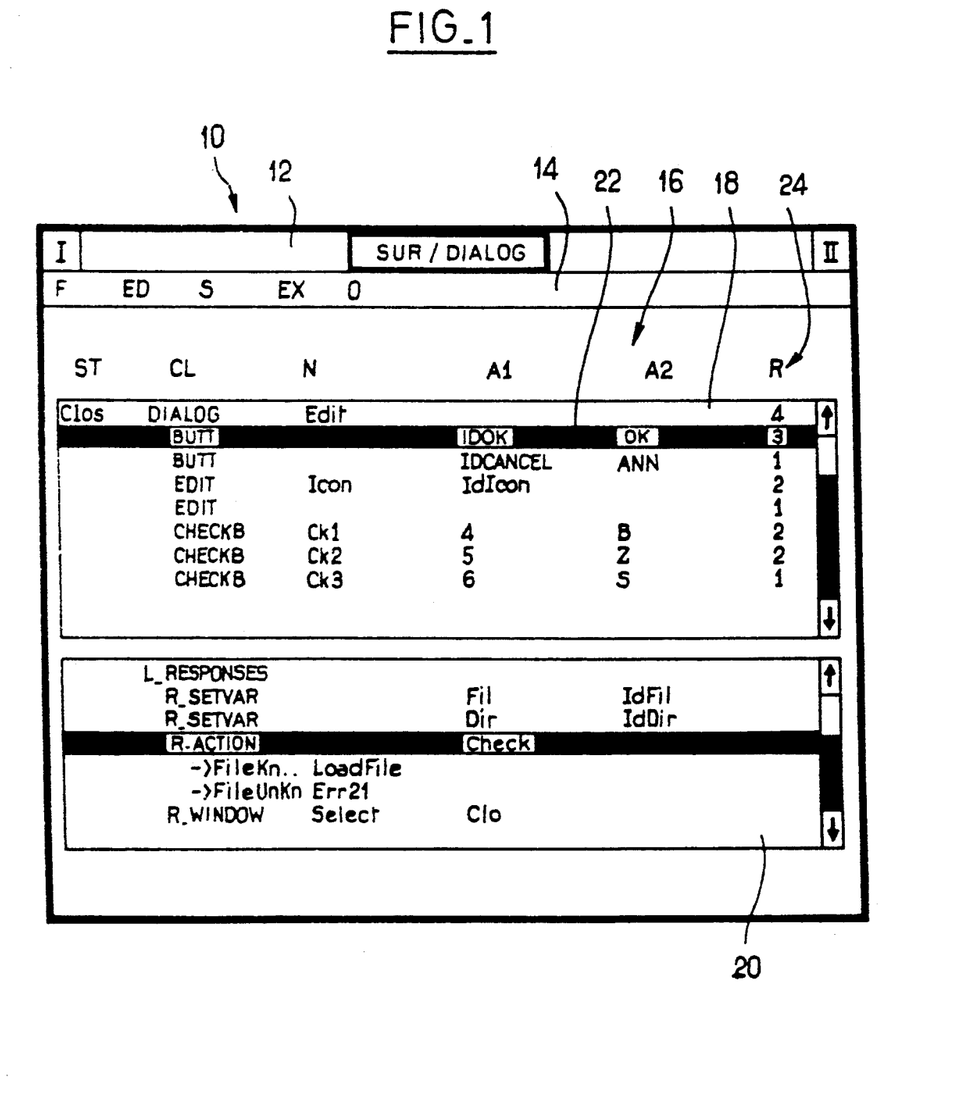
FIG. 1 shows the on-screen display of a synoptical table contained in the survey window "SUR/DIALOG" corresponding to an item belonging to the class of dialog boxes.

Turning now to FIG. 1, the title bar 12 of the window 10 displays the title SUR/DIALOG and has standard callup zones at its ends that can be activated in particular by the pointer of a mouse. Zone I of the title bar 12 enables access to the command menu of the MS-Windows environment, while zone II enables conversion to an icon or a shift from the window to the full screen.

The reader is referred generally to the various user manuals for the aforementioned hardware and reference manuals for the software used, in particular the manuals for MS-DOS and the MS-Windows environment (especially the book, "Programmer's Guide to Windows" by Durant, Carlson and Yao, published by Sybex in 1987).

In addition to the title bar, the window 10 includes a zone that is available to the user. This zone can accommodate various survey and/or working windows used by the set of programs called PANORAMA.

In FIG. 1, the window 10 also includes two essential elements in the context of the invention: first, the PANORAMA menu bar 14 placed on the title bar 12, and second, a zone hereinafter called the survey window 16 (the current title, "SUR/DIALOG", of which is displayed in bar 12), in which a synoptical table appears that represents the constitution of a dialog box (DIALOG) called "Edit", which is part of the interface being created or modified. The PANORAMA menu bar includes five successive menus, encoded F for File, ED for Editing, S for Survey, EX for Expansion and 0 for Options. All these menus will be described in detail hereinafter; however, it should be noted here that the survey window "SUR/DIALOG" displayed in FIG. 1 corresponds specifically to the choice of the "dialog box" command in the Survey menu.

Before commenting on the contents of the synoptical table shown in the survey window 16, a description should be given of the constitution of a user application interface structured around a window and including visual and/or dynamic items that may or may not be associated with reactions in response to a predefined event.

From the conceptual point of view, the notion of class is introduced in order to designate sets of similar items on the functional plane or on the presentation plane. Thus the PANORAMA set includes on the one hand classes of items that participate in the presentation of the interfaces:
- window;
- dialog box;
- menu bar and its components, menu and menu choice;
- message box;

and on the other hand, classes of items that participate in the interface dynamics and are essentially structured around the notion of events/responses:
- list of responses;
- list of named responses (NRL);
- list of messages (ML);
- action (class corresponding to a callup of particular functions of the user application) p1 - variable (class of items that enable saving, initializing, and updating of control elements for the dialog box, hereinafter called CONTROLS);
- initial status (this item, comprising responses, makes it possible to define an initial status for the interface prior to its connection with the user application).

The PANORAMA set of programs makes it possible to create and modify examples of these classes for the interfaces being developed. The following format will be used to describe each of these classes:
- Description - this rubric relates to the nature and appearance of instances of this class and gives the list of possible components of the items in the class.
- Attributes - this rubric itemizes the various attributes of the class in question. These attributes are those that the developer must furnish in order to be able to create an instance of the class in question.
- References - this rubric gives the list of particular items that can call up or use an item belonging to the class in question.
- Components - this rubric presents the components of the items of the class in accordance with the above scheme.

At this stage, the following points should be noted:

A response corresponds in fact to a reaction to an event predefined either inside or outside the interface (such as using the mouse to point to and select a CONTROL in a dialog box). These responses, subsequently designated by the capitalized word Responses, are preset in PANORAMA and are arranged in 14 separate types, which will be described in detail hereinafter. The form in which these Responses are written "R_TYPE", such as "R_WINDOW". It should be noted that in the context of the invention the number of types of Responses, in this case 14, is unlimited.

The Responses of the PANORAMA program set cannot be called up except by events affecting items or components belonging to particular classes. These are defined as "upstream" associations for the Responses.

Finally, certain Responses of the PANORAMA software call up actions for items belonging to particular classes. These are defined as "downstream" associations, or References, for these Responses.

The item formats to be presented below are applicable to all the items belonging to an interface to be created by PANORAMA. Moreover, for the sake of efficacy, the designer has made the choice to apply the same formats to various elements, or visual items, belonging per se to the set of PANORAMA development programs (for example, the dialog windows are defined as particular dialog boxes), in particular to enable "self-construction" of the PANORAMA set.

I. - WINDOWS

Description

The windows always include a name to identify them and are capable of being reduced to icons. Optionally, a window can include a menu bar.

The windows may have a private procedure for processing messages (this is a procedure to be developed by programming in the MS-Windows environment), or the standard message processing procedure offered by PANORAMA may be used.

Attributes

Name: the identification symbol used by PANORAMA to enable resolving the references to this element class.

Title: the title the user will see on this window.

Icon: the name of the icon the user wishes to associate with a window.

Menu bar: the name of the menu bar, optionally associated with the window.

Message processing:

type: private (WINDOW PROC) or standard (MESSAGE PROC).

name: of the message processing procedure (by a code specific to the MS-Windows environment), if the type is private, or of the list of messages created in PANORAMA, if the type is standard.

Optional properties: moving from place to place, changing size, shifting to the full screen, vertical scrolling, horizontal and frame scrolling.

It should be noted that all these attributes are defined in the interactive mode by way of the working windows used by PANORAMA, as will be explained later on below.

References

A window may be referenced by the following two responses: R_WINDOW and R_MENUBAR.

II. DIALOG BOXES

Description

The dialog boxes are temporary windows created from a file of resources in the MS-Windows environment. In the present case, the dialog boxes have formats created beforehand in the MS-Windows environment, such as a file opening box, a file saving box, and so forth. The particular definition of each dialog box is obtained by a dialog editor, also available in the MS-Windows environment. Message processing can be assured by a private procedure to be developed by programming, still in the MS-Windows context, or by a standard procedure furnished by PANORAMA.

It should be noted that in general, for the sake of coherence and efficacy, the PANORAMA program set designer sought to make good use of the resources offered by the MS-Windows environment, as a graphics support environment. Naturally the invention is not limited by the choice of the MS-Windows graphics environment; it can be utilized in other graphics environments as well, with appropriate redefinition of the items, and/or some other process for creating items, nevertheless adhering to the basic specifications of the invention as presented here.

The components of the dialog boxes are called CONTROLS.

The use of a block data exchange module of the cut-/copy/paste type makes it possible to transfer dialog boxes, being created by the dialog editor of MS-Windows, to the interface being created by the PANORAMA program set. It is then possible to associate Responses with the various CONTROLS.

Attributes

The only PANORAMA dialog box attribute is its name. Otherwise, the attributes defined in MS-Windows are used without modification. For example, a dialog box may be modal (inhibiting in the application) or amodal.

References

A dialog box may be referenced by the following two responses: R_DIALOGBOX, R_ENDDIAL.

Dialog box components, or CONTROL

The CONTROLS appear in the dialog boxes to enable users to capture or display data. These class includes the following components:

- text: a character string serving as a general title for other controls (in particular for text zones).
- text zone: a zone enabling data input;
- list box: a vertically scrollable box (done with the aid of a vertical scrolling bar) containing a list of choices that can be selected;
- buttons: string of characters that can be selected making it possible to initiate a command (these buttons exist in various forms, in particular in the forms of a "radio button" and "check box");
- vertical/horizontal scrolling bar: bar for scrolling through the contents of a CONTROL, of a list box in particular.

These CONTROLS are differentiated by whether they are displayable or not and/or are selectable or not. In PANORAMA, a CONTROL is called selectable if a Response can be associated with it.

CONTROL attributes

The visual attributes of the CONTROLS are defined with the aid of the dialog editor of the MS-Windows environment. The PANORAMA program set also enables defining a name and responses for the selectable CONTROLS (which are all the CONTROLS shown, except for the "text" CONTROL).

References

The CONTROLS can be referenced by the following responses: R_SETVARIABLE, R_CTLSTATUS, R_SELECT and R_FORWARD.

III. MENU BAR

Description

The menu bar class includes the menu components (horizontal titles in the menu bar) which in turn include the menu choice components.

A menu bar is associated with a window, either at the moment the window is created or dynamically in response to a command (by way of the Response R_MENUBAR). The menu bar cannot have menus that have Responses directly. The menu bar can be dynamically modified in order to adapt to the profile of the end users of the interface (short or long menus), or to better reflect a context (new windows, new dialog boxes).

Attributes

The only attribute of the menu bar is its name.

References

A menu bar can be referenced by the response R_MENUBAR.

IIIa. Menu bar components: The menus

Description

A menu is a component of a menu bar and its components in turn are the menu choices.

Attributes

A menu includes a single attribute, the title. The title is the name that the menu will carry in the menu bar of the window with which it is to be associated.

References

A menu is never referenced directly in PANORAMA.

IIIb. Menu components: The menu choices.

Description

A choice is a subcomponent of a menu bar and a component of a menu. The menu choices fulfill four functions: initiating the commands, calling up a dialog box to enable initiating a command containing parameters, positioning a status indicator, and altering the function mode of a command.

Besides the choices, the menu can include static elements known as separators, designed to provide visual separation of the groups of choices in the same menu.

The PANORAMA program set associates one or more Responses with the non-separator choice.

Attributes

Type: choice or separator.

Indentifier: number or character string enabling a distinction among choices in the menu bar.

Title: the name the choice will have in the menu being shown.

Item Status: shaded or not (shading signifies that the choice is unavailable), checked off or not (the checked-off choice represents the current selection).

References

The menu choices can be referenced with the Response R_ITEMSTATUS.

IV. MESSAGE BOX

A message box is a particular dialog box defined in the MS-Windows environment. A message box includes a title bar, a text, and one or more button. A message box is used to display messages, for instance an error message or a request for confirmation.

The definition of a message box will not be repeated in detail here. Nevertheless, it should be noted that a message box has a name and can be referenced by the Response R_MESSAGE.

Before presenting the classes of dynamic items of the interface, it will be useful to return to the "Item Status" (ST) clause of an item of the interface, a clause that has already been encountered in the description of menu choices.

Like the items, the windows and the dialog boxes are capable of having four statuses: open, closed, active, and undefined (UNDEF), when a window or dialog box appears under its identifier in a Reference before having actually been created. The menu bars and message boxes include two types of status: defined and undefined.

V. RESPONSES

Among the dynamic elements of the interface, the Responses form an essential class in the set of PANORAMA development programs. Their attachment to certain interface items or components is not done directly, but rather through a list of Responses (hereinafter, Response List, for short, shown on the screen as "L_RESPONSES"), which pools the Responses associated with the same item in ordered fashion, to be executed sequentially. The Response Lists are made up of Responses to which they distribute the messages they receive. The Response Lists can be empty, especially when they are initially attached to an element in the process of being created. The Responses are executed in the order of the list; the execution of certain Responses sets an "execution status" of the interface (actually it loads the contents of a reserved register in the interface with a given value) and can be followed by conditional branch Responses known in turn as Conditions. A Condition includes at least one particularly identified list of Responses (known in this case as Named Response List or NRL) that is associated with an identifier of predetermined value. The equality of the identifier value with the "execution status" of the interface resulting from the execution of the preceding Response causes branching and execution of the associated Named Response List. Table I shows the Responses available in the PANORAMA set of development programs and their possible "upstream" associations (+) per component class: menu choice (ITEM), dialog box controls (CONTROL), messages (MES), Named Response List (NRL), and initial status (IS):

TABLE I

|  | ITEM | CONTROL | MES | NRL | IS |
|---|---|---|---|---|---|
| R_ACTION | + | + | + | + | + |
| R_BEEP | + | + | + | + | + |
| R_CTLSTATUS | − | + | − | + | − |
| R_DIALOGBOX | + | + | + | + | + |
| R_ENDDIALOG | − | + | − | + | − |
| R_EXIT | + | + | + | + | + |
| R_FORWARD | − | + | − | + | − |
| R_ITEMSTATUS | + | + | + | + | + |
| R_MENUBAR | + | + | + | + | + |
| R_MESSAGEBOX | + | + | + | + | + |
| R_SELECT | − | + | − | + | − |
| R_SETCONTROL | − | + | − | + | − |
| R_SETVARIABLE | − | + | − | + | − |
| R_WINDOW | + | + | + | + | + |

The various Responses available in PANORAMA will now be briefly described below:

R_ACTION: This Response enables execution of a subroutine that is known to PANORAMA but exists in the user application. Its sole attribute is the name of the action, to enable calling up this function in the user application from the interface.

R_BEEP: This Response makes it possible to produce a sound and is used particularly for warning the end user.

R_CTLSTATUS: This Response makes it possible to modify the status of a CONTROL. Its attributes are the name of the dialog box, the identifier of the CONTROL, and the operation to be performed on the CONTROL, e.g., shaded or not, "hidden" or not.

R_DIALOGBOX: This Response enables opening and initializing a dialog box. The attribute of this Response is the name of the dialog box, which in turn has the attribute of the type of dialog box (modal or amodal) or the name of the Named Response List for initializing message processing (standard procedure).

R_ENDDIALOG: This Response enables closing a dialog box and entering a return code. Its attributes are the name of the dialog box and the return code.

R_EXIT: This Response makes it possible to exit the L_Response that includes it. It has no attribute. These Response is used in the conditional branch Responses.

R_FORWARD: This Response enables forwarding information from one CONTROL to another CONTROL in the same dialog box. Its attributes are the name of the source CONTROL and the name of the target CONTROL.

R_ITEMSTATUS: This Response enables modifying the execution status of a menu choice. Its attributes are the name of the menu bar, the identifier of the menu choice, and the operation to be performed on the menu choice, such as "shaded" or not, or "hidden" or not.

R_MENUBAR: This Response makes it possible to dynamically associate a particular menu bar with a given window. Its attributes are the name of the menu bar and the name of the window.

R_MESSAGEBOX: This Response enables opening a message box to inform the end user of an act via the contents of a message. Its attributes are the title of the message box, the type of message box (execution status, note, warning, stop), the identifier of the message, or the contents of the message.

R_SELECT: This Response enables placing the active point on a given CONTROL of a dialog box. Its attribute is the name of the CONTROL.

R_SETCONTROL: This Response enables giving a CONTROL the contents of a variable. Its attributes are the name of the CONTROL, the name of the variable, and optionally, for a CONTROL constituted by a list box, the index in which the list is located and the new list of elements.

R_SETVARIABLE: This Response enables saving the contents of a CONTROL in a variable. Its attributes are the name of the variable, the name of the CONTROL, and for the CONTROLS of the list box type, the index or the contents of the current element in the list.

R_WINDOW: This Response enables performing an operation on a given window. Its attributes are the name of the window and the type of operation (open, activate, close, enlarge, shrink).

VI. NAMED RESPONSE LIST (NRL)

The named response lists are the Response Lists having a name. Unlike the Response Lists, these named response lists can be referenced. They can also be called up directly from the user application. These feature is especially valuable because it enables complete separation in the encoding of programs for the interface and those for the user application, while authorizing direct access to the interface from the user application upon request.

The only attribute of these lists is their name. They can be referenced by the Responses R_DIALOGBOX, a menu choice, a CONTROL, and a message.

VII. ACTION

This class is made up of the subroutines of the user application that are referenced in the interface. Its only attribute is its name. It can be referenced by R_ACTION or by the attributes of the window or dialog box provided in the MS-Windows environment.

VIII. MESSAGE LIST

This class of item enables the applications windows to respond to the various messages generated by the system. Its attribute is its name and it can be referenced by a window or dialog box. The components of this class are messages incorporated in PANORAMA.

The messages are the components of the message lists. They are dynamically generated in the MS-Windows environment by the actions of the user. The attributes of the messages are an identifier (sent dynamically by the MS-Windows environment, which translates an action of the end user on the interface) and the name of the associated Named Response List. The messages cannot be referenced.

IX. VARIABLE

This class of element enables the interface to save or modify the contents of the CONTROLS. The attributes of a variable are its name and its initial value. It can be referenced by the Responses R_SETVARIABLE and R_SETCONTROL.

X. INITIAL STATUS (IS)

This class of element enables the dynamic execution or testing of the interface with a particular Named Response List known as "Initial Status". For a predetermined interface, only one element of this class can be created. However, like any Response List, Initial Status can contain conditional branches.

The first part of the description of the invention has made it possible to present in detail all the constituent elements of an interface generated by the PANORAMA set of development programs, including the reactions to events inside or outside the interface and the interrelations among these constituent elements at the level of this interface. The ensuing second part of the description will be dedicated to presenting the structure of the PANORAMA set of development programs and its implementation in the context of the invention.

The elements for dialog with the developer/user of the interface included in the PANORAMA set of development programs are a menu bar 14 or PANORAMA menu bar already mentioned, at least one survey window 16 by which the instantaneous synoptical table representing the constitution of all or part of the interface will be presented, and finally a series of working windows, to be described later herein.

Looking now at FIG. 1, it can be seen that the main function of the survey window is to display the descriptive status of the elements of a selected class (such as Dialog Box), so that the user can identify them, distinguish them from one another, and manipulate them easily. The interface elements that are displayed in the survey window are presented in uniform fashion, regardless of the class selected. The survey window 16 includes two elements, in the form of lists, that structure the displayed information: a list box marked "items" or Item List 18, in its upper portion, which gives the list of interface elements corresponding to a selected class (or all the classes, in the event that the "all classes" option in the survey menu is selected), and a list box marked "Responses" or Response List 20, in the lower portion of the survey window, showing the Response List (and the Responses belonging to this list) associated with this currently selected element 22 in the list box 1 (see FIG. 1, line 22 displayed on a dark background).

The design of the synoptical table of the interface displayed globally on the screen, or in part in the various survey windows, is based on the following three main ideas: structuring the information; providing maximum information on the status of the interface; and indicating the levels of dependency among the constituent elements by way of indentations.

Structuring the information: The two main items in the survey window 16 are the Item list and the Response List. The information contained in these two lists (a constituent element of the interface per line) are structured in a column, in the manner shown in FIG. 1, to provide a descriptive status of the various constituent elements in the two lists. Looking at the survey window 16 shown in FIG. 1, the columns are positioned along a line 24 of the field (or descriptive rubrics) itemized as follows from left to right: ST for "item status"; CL for "class"; N for "name"; A1 for "attribute 1"; A2 for "attribute 2"; and R—for the number of References.

Providing maximum information on the status of the interface: Two kinds of information are presented in the attributes: first, the information input by the user (name of the element and/or main attributes of the elements defined above), and second, the attributes generated by PANORAMA (the status of the element and the number of references made by Responses to this element).

Indicating the levels of dependency among the constituent elements: For the classes of Response Lists, menu bar, dialog box and message list, what the components include, the developers need to be able to see this compositional relationship in the Item List and Response List. These compositional levels are indicated by indentations among the components.

By way of example, in FIG. 1, the dialog box (CL=DIALOG) named "Edit" in the Item List 18 includes seven components, two of the button type (CL=BUTT), two of the text zone type (CL=EDIT), and three of the check box type (CL=CHECKB), which is a special case of button components. All these components belong to the class of CONTROLS.

Similarly, the indentation is used in the Response List 20 shown in FIG. 1 to distinguish the Response Lists (such as L—RESPONSES) from Responses (R—SETVAR, R—ACTION, R—WINDOW) and Conditions (FileKn, FileUnKn).

It should be noted that the indentation is particularly important upon presentation of the composition of a menu bar with its menus being shown and the various menu choices.

For the Item List, the interface elements are displayed by class selected, in alphabetical order of the names they carry in PANORAMA. If an element (for example a menu choice) is not named, it is displayed in the order of its first attribute or of its position in its group, such as the menu.

In the Item List 18 shown in FIG. 1, line 22 on the dark background corresponds to the constituent element selected. This element is a valid button, CL=BUTT (since the column ST, "Item Status", is blank and has no indicators). This CONTROL has no name, but it does have an identifier, "IDOK", in column A1, and a title, OK", in column A2. Finally, this button has been the subject of three references in the interface (the number 3 now appears in column R).

The Response Lists are presented in a particular list box 20 of the survey window, called Response List and shown on the screen as L—RESPONSES. The Response List shown in FIG. 1 is the one attached to the element 22 selected in the Item List, that is, the "OK" button of the "Edit" dialog box. If this button has been selected, the following Responses ensue when the interface is executed:

1) Two items of the "variable" class will save the name of a file and its directory (two R—SETVAR Responses).

2) An "action" function, named "check", which is part of the user application, must be called up to validate or act on the information entered by the end user in the "Edit" dialog box (Response R—ACTION). This "check" function is terminated by loading the execution status register of the interface.

3) Depending on the "execution status" of the interface, one of the two conditional branch Responses (Conditions) "FileKn" or "FileUnKn" will be called up to execute the associated Response List.

4) An interface window named "Select" will be closed (Response R—WINDOW).

The survey window is also capable of displaying the Conditions attached to a Response List. In this case, the basic window takes the title "SUR/CONDITION". An example of how this window looks is given in FIG. 2, which for comparison shows a particular list box 26 called Conditions List. A Conditions List contains the details of the Conditions following a selected Response from a Response List (in the present case, the Conditions following the Response R—ACTION in FIG. 1). The hierarchy is indicated in the Conditions List 26 by indentations, with up to three levels of interlacing (since a Condition can contain Responses followed by other conditional branch Responses). Each condition is marked by a small arrow (→). When the current element in the Conditions List is a Condition, the field N (name) contains the name of the Named Response List associated with the Condition. The fields ST and R are omitted in the field line 28.

Figure 2:
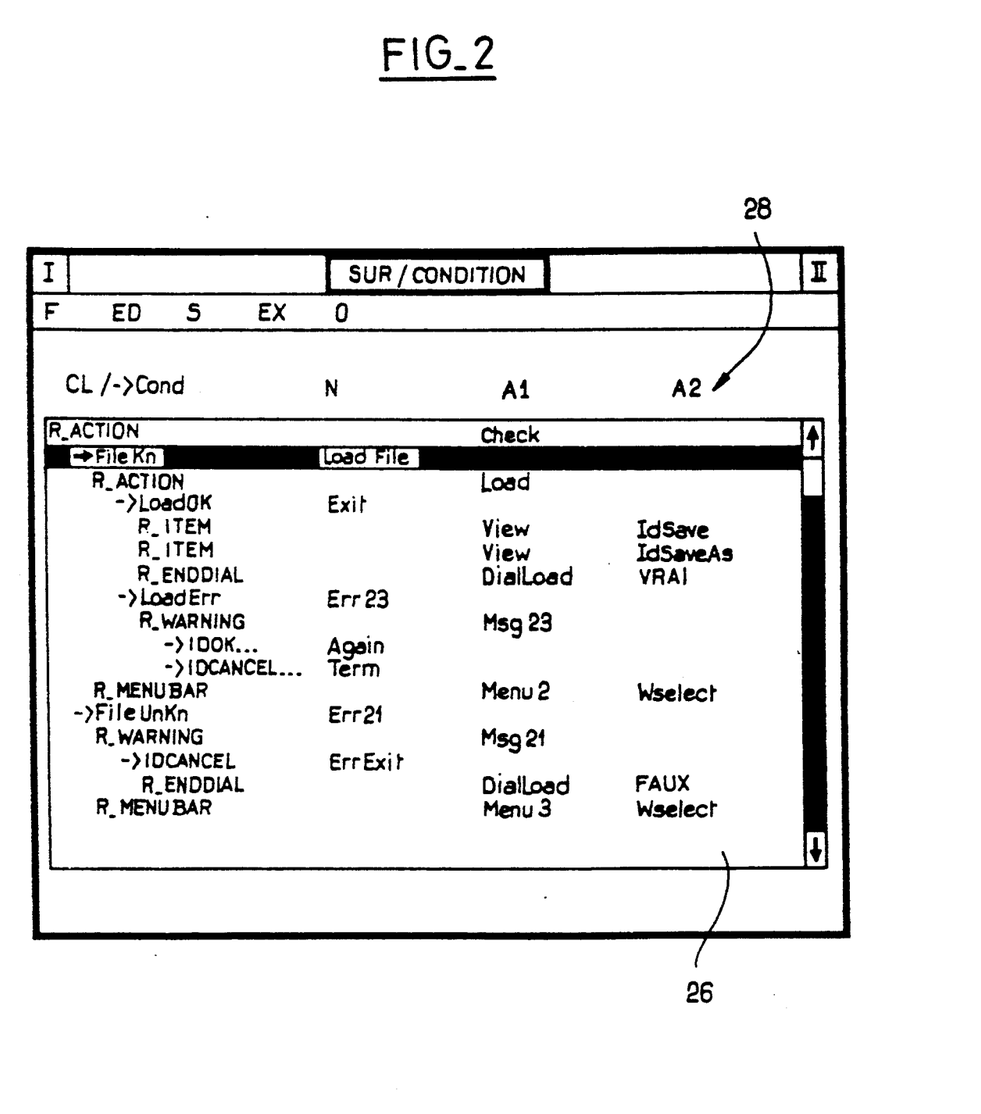
FIG. 2 shows the on-screen display of the contents of another survey window, "SUR/CONDITION", showing a synoptical table of the Conditions following a Response designated as R_ACTION and selected in the synoptical table of FIG. 1.

Looking at FIG. 2, the execution of the "check" function called up by the Response R—ACTION is ended by loading the execution value "File Known" ("FileKn") or "File Unknown" ("FileUnKn") into the status register of the interface, under the conditions in which this function is performed. Branching in the Condition "FileKn" calls up the Named Response List "LoadFile", including the R—ACTION Response named "Load", which terminates with loading of another execution value into the status register, this value being "Loading Performed (LoadOK)" or "Loading Error (LoadErr)". Branching in the "LoadOK" Condition calls up the Named Response List named "Exit", which in turn is made up of two Responses, R—ITEM and R—ENDDIAL. Branching in the "LoadErr" Condition calls up a Response R—MESSAGE (R—WARNING) followed by two Conditions. The execution sequence of the "FileKn" Condition followed by the response R—MENUBAR associates the menu bar named Menu2 with the "Wselect" window.

The menu bar 14 of the PANORAMA set of development programs has the structure described below, incorporating the five menus already mentioned, that is, File (F), Editing (ED), Survey (S), Expansion (EX), and Options (O). The menu commands proceeding along the PANORAMA menu bar are itemized in Table II below. It can be noted that for the File, Editing and Survey menus, the commands are classified by groups, suitably demarcated by static separators, such as ======, when they are displayed on the screen.

TABLE II

| | |
|---|---|
| (F) FILE | • new |
| | • open |
| | • save |
| | • save as |
| | • initial execution |
| | • exit |
| | • a propos |
| (ED) EDITING | • cut |
| | • copy |
| | • paste |
| | • (variable section) |
| | • attributes |
| (S) SURVEY | • window |

TABLE II-continued

|  |  |
|---|---|
|  | • menu bar |
|  | • dialog box |
|  | • message box |
|  | • named response list |
|  | • message list |
|  | • action |
|  | • variable |
|  | • initial status |
|  | • all classes |
| (EX) EXPANSION | • components |
|  | • conditions |
|  | • references |
| (O) OPTIONS |  |
|  | • display |
|  | • execution test |

FILE MENU

The File menu includes two groups of commands: the first relates to manipulation of files pertaining to interfaces already created or in the process of being created; the second relates to the PANORAMA set of programs itself.

The first group includes the following standard commands: "new", "open", "save", "save as" (i.e., save as some file name). A final command is also included, called "initial execution" which enables testing the interface in the user application from the initial status of the interface. This command can be used in particular for fast creation of prototype interfaces.

The second group of commands includes the "exit" command and the "a propos" command, which makes it possible to give instructions on the versions of the programs making up the PANORAMA set.

SURVEY MENU

This menu makes it possible to select a class of elements to be displayed in the survey window and on which the developer wants to work. The selection of a given class makes it possible to obtain a detailed portion of the synoptical table of the interface. The options on the Expansion menu also enable working on very detailed sub-portions of the synoptical table. The new first commands of the Survey menu correspond to the classes already presented above, namely "window", "menu bar", "dialog box, "message box", "action", "variable", and "initial status". A tenth command, "all classes", enables selecting all the classes, and obtaining a complete synoptical table of the interface. Depending on the class selected (or on the type of constituent element selected), the title on the survey window will consequently be modified (such as SUR/DIALOG, SUR/CONDITION), to tell the developer where he is in the Survey menu.

EDITING MENU

With this menu, the interface elements can be created, copied and reordered. It comprises three groups of commands; two of them are permanent, while the third one is contextual with variable contents; it is updated each time a class changes in the Survey menu and is used for creating new constituent elements of the interface.

The first group of commands of the Editing menu includes the three conventional commands "cut/copy/paste" of a module for exchanging information by block of constituent interface elements.

The second permanent group includes only a single command, "Attributes", the selection of which brings about the opening of a dialog window, also called a working window, which has the attributes of the current element selected in one of the lists (Item List/Response List) displayed in the survey window.

The third group of commands, "Variable Section", in the Editing menu has variable contents, displayed in the survey window before entering the Editing menu.

Entering the Editing menu from the "window" class of the Survey menu: The "new window" command makes it possible to create a new window.

Entering from the "dialog box" class: The "new dialog box" command enables incorporation of a new dialog box, optionally created from the MS-Windows environment, with the interface being developed. The "new response" command enables adding a new Response to the Response List of the current CONTROL. Finally, the "new conditions" command enables adding a new Condition after a Response.

Entering from the "menu bar" class: With the "new menu bar" command, a new menu bar can be created. With the "new menu" command, a new menu can be created in the current menu bar. The "new menu choice" command makes it possible to create a new menu choice. The group also includes the "new responses" command, for associating a Response with the Response List of the current menu choice, and the "new condition" command already described above.

Entering from the "Named Response List" class: The "new named response list" command enables creating a new named response list. This group also has the "new response" and "new condition" commands already described.

Entering from the "message list" class: This group includes the four commands, "new message list", "new message", "new response", and "new condition".

Entering from the "message box" class: This group includes only one command: "new message box".

Entering from the "initial status" class: This group includes the two commands, "new response", and "new condition".

Entering from the "variable" class: This group includes only one command, "new variable".

There is no contextual option at all when entering the Editing menu with the "action" and "all classes" commands in the Survey menu.

EXPANSION MENU

With this menu, the selection made in one of the two lists, Item List or Response List, displayed in the survey window of the Survey menu can be modulated and enlarged.

If the class is appropriate (menu bar, dialog box, or message lit), the first command, "component", enables expanding the display to the components of the current element. Thus it is possible to work on a CONTROL of a dialog box (see FIG. 1).

The second command, "condition", enables expanding the display to the Conditions following a Response (see FIG. 2).

Finally, the "reference" command enables displaying the items that reference the current element, by way of the Responses associated with them.

OPTIONS MENU

This menu includes two commands. The first, "display", enables on-screen display of the interface or current item of the interface being developed. The second command, "execution test", enables testing the interface from its current status. This last command is quite useful to the developer, because it enables him to test his work as it proceeds during the development of the interface, without having to use special programs outside the PANORAMA program set, and in particular without having to perform the complicated operations of compiling and editing links. The use of the PANORAMA set is especially well adapted to making interface prototypes.

THE WORKING WINDOWS

The working windows enable editing the attributes and are used to enable creating and/or modifying elements of the interface. All these working windows are dialog windows of the same size and they occupy the right-hand part of the survey window. (It should be noted that the left-hand part of the survey window remains visible to the operator, who always has access to the rubrics of item status (ST), class (CL) and name (N) of the elements present in the Item Lists and Response Lists). They all include two buttons, "OK" and "CANCEL" (shown as ANN in the drawing) at the top and on the right-hand side of the window.

These working windows serve to enter the parameters needed by PANORAMA in order to create and modify the elements. They accordingly take on the same attributes as described above for each of the classes.

Figure 3:
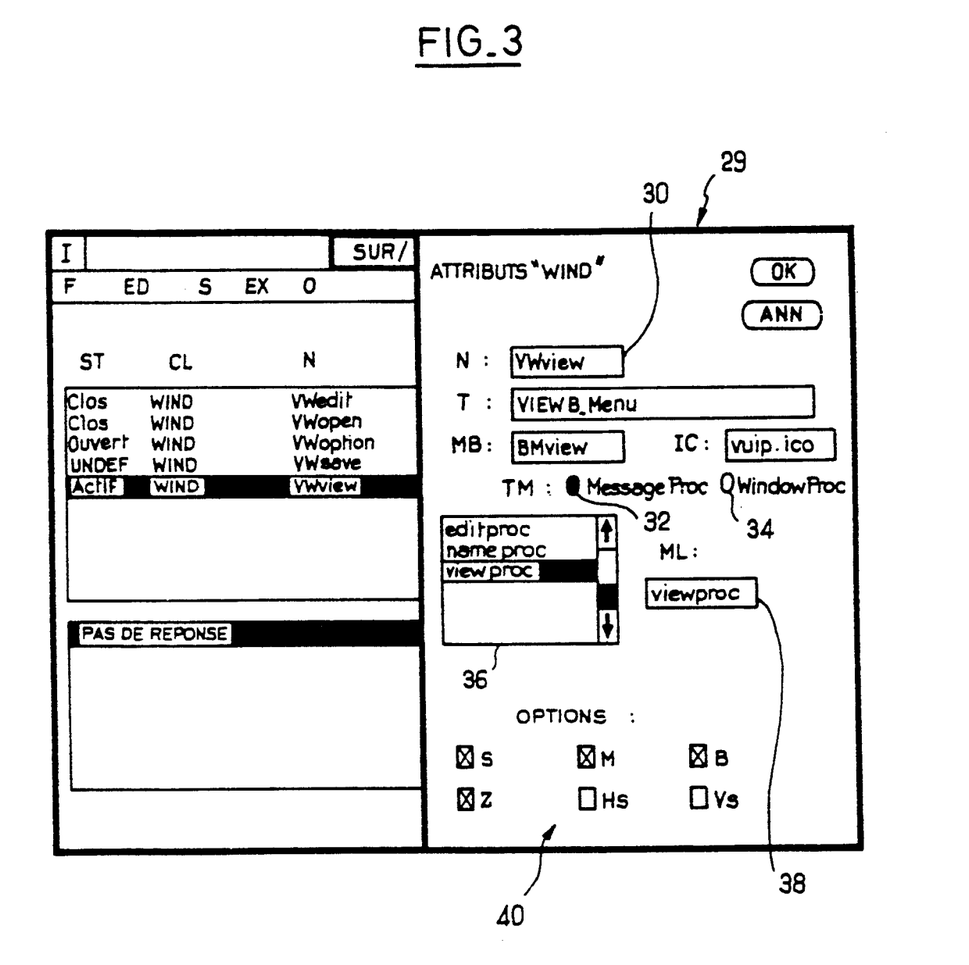
FIG. 3 shows the on-screen display of a working window corresponding to the window (WIND) called "VWview" selected in the synoptical table shown in the left-hand portion of this same drawing figure.

By way of example, FIG. 3 shows the working window 29, corresponding to the "attributes of the window class". Besides its title, "Attributes 'WIND'", the working window 29 includes the two buttons, "OK" and "CANCEL" (shown as ANN in the drawing).

As can be seen in the left-hand portion of FIG. 3, the current window (encoded WIND in column CL) selected in the Item List corresponding to the survey window associated with the "window" class is named "VWview". This name is displayed in a text zone 30 (rubric N) of the working window 29. The title of the "VWview" window is "VIEW B_Menu" (rubric T). Associated with this window is the menu bar "BMView" (rubric MB). Also associated with this window is an icon named "vuip.ico" (rubric IC).

The rubric TM corresponds to message processing and includes two buttons 34, 32 for private processing (WindowProc), or standard processing (MessageProc). Since the MessageProc button 32 has been selected, the list box 36 of the message list displays the list of messages that have already been created and are available to the developer. The name of the list selected, "viewproc", is displayed under the rubric ML in text zone 38. Finally, the lower part of the dialog window 29, relating to the attributes of the "window" class, includes information on the optional properties of a window (the rubric is "OPTIONS"), which are in the form of six marking boxes 40, four of which in the example shown are checked off. The marking boxes 40 have the indicators S (size modification), M (move), B (frame), Z (move to full screen), Hs (horizontal scrolling) and Vs (vertical scrolling).

The other working windows of the PANORAMA set of programs are in a similar format, adapted for each category of constituent elements of the interface, as a function of the particular attributes defined and presented above.

PANORAMA also includes dialog command boxes used for the commands of the File menu. These dialog boxes are sufficiently familiar in the art and include means for displaying the file name and optionally a list box for displaying the files in a directory. They also have the two buttons, OK and Cancel.

Figure 4:
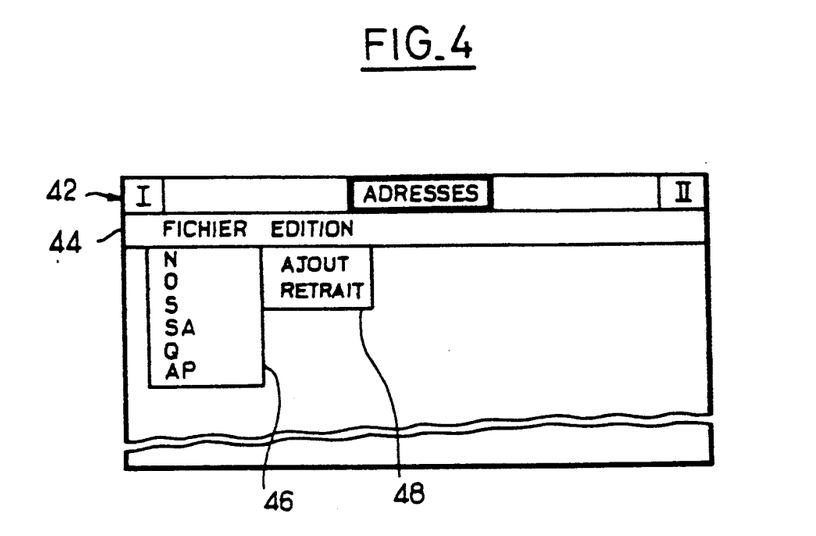
FIG. 4 shows an example of an interface that can be achieved by using the method according to the invention.

The PANORAMA set of programs is implemented as follows:

For the sake of defining the concept, FIG. 4 shows the display of an exemplary interface for an Address Directory application. This type of user application makes it possible to store the addresses and telephone numbers of various individuals listed by their names. The end user can consult names and addresses, update them, add new names, or delete them. In the example shown in FIG. 4, the interface to be created includes a window 42 provided with a menu bar 44, with two menus 46, 48 and one message box. The message box (not visible) is associated with the "a propos" command (AP) of the FILE menu. Also incorporated into this interface are two dialog boxes 50, 52, shown in FIG. 5 and described hereinafter.

After starting the PANORAMA program set in the MS-Windows environment by calling up a file named PANORAMA.EXE, the developer sees a survey window appear, with an empty Item List under the PANORAMA menu bar.

The first item to create will be the ADDRESSES window. To do this, the pointer must first be moved to the "window" command in the survey menu. The survey window then assumes the title SUR/WINDOW displayed in the center of the title bar. After that, the Editing menu is selected with the mouse, and then the "new window" command in that menu. The working window corresponding to the "Attributes of the window class" will then appear (see FIG. 3), and is then duly filled. For example, the rubric N will be filled from the keyboard with the name "W-A", and the rubric T will be filled with the title "ADDRESSES". The developer will validate the creation of the window by clicking on the OK button from the mouse. A new line corresponding to the "ADDRESSES" window will appear on the screen in the Item List of the survey window SUR/WIND, thus enabling the operator to permanently monitor the progress of his work.

The second item to be created is a menu bar named "MB-A". To do this, the Survey menu must be selected, and then the "menu bar" command in this menu. The survey window SUR/MENUBAR will then be displayed on the screen. Next, the Editing menu is selected with the mouse, and then the "new menu bar" command in the Editing menu, to make the corresponding working window appear, in which the name of the menu bar, that is, "MB-A", will be entered. The operation is then validated by clicking on the OK button.

Next, menus and menu choices must be crated. The first menu 46, named FILE, includes six commands: New (N), Open (O), save (S), save as (SA), Exit (Q) and A Propos (AP). The second menu 48, named EDITING, includes two commands, ADD and DELETE (shown as AJOUT and RETRAIT, respectively, in FIG. 4).

To create the menus of menu bar MB-A, one must first be in the Item List of the survey window for the menu bars, and then on the menu bar MB-A (Survey menu, "menu bar" command). Next, the operator must look in the PANORAMA menu bar for the Expansion menu and select the choice "component". A new survey window corresponding to this choice is displayed on the screen. Next, the choice "new menu" must be selected in the Editing menu. A working window of the "menu attributes" type is then displayed in the right-hand part of the screen. It is thus possible to enter the menu title, in this case FILE, and to validate this creation by clicking on the OK button.

To create the choices in this menu, one must be in the "menu bar" survey window, and then in the Item List on the menu line named FILE. The Editing menu is then selected, and in it, the "new choice" command is selected. Once again, a new working window (menu attributes) is displayed, in which the operator can enter the information enabling the creation of various choices, in particular the title, the item status ("shaded" or not, "checked off" or not), the type, the identifier, and the name of the Named Response List attached to this choice.

To create a message box, the operator moves back to the Survey menu and then selects the "message box" command. Then he enters the Editing menu and selects the "new message box" command. In the corresponding working window enabling creation of the message, the operator enters the name of the message, the type of message, and the contents of the message that is to be displayed on the screen in the event of later activation. The thus-created message box must now be associated with the "a propos" (AP) choice of the FILE mene. The Response R_MESSAGEBOX is used for this operation. To add the Response R_MESSAGEBOX to the choice AP, the operator enters the Survey menu and selects the choice "menu bar", then moves to the Expansion menu, selects the command "component" to enable display of the survey window that itemizes the menu bar, the two menus, and the choices of the two menus already created. In the Item List of the survey window, the operator selects the line corresponding to the choice "AP" and then moves to the Editing menu. Selecting the "new response" command causes a working window to be displayed. In this working window (Response Attributes), a list giving the names of the Responses preset by PANORAMA as defined above that are available for this component is displayed. The operator selects the Response R_MESSAGEBOX and confirms this choice by clicking on a validation button. Another working window then appears, saved in a storage memory by using the "save" command in the File menu of the PANORAMA menu bar.

Figure 5:
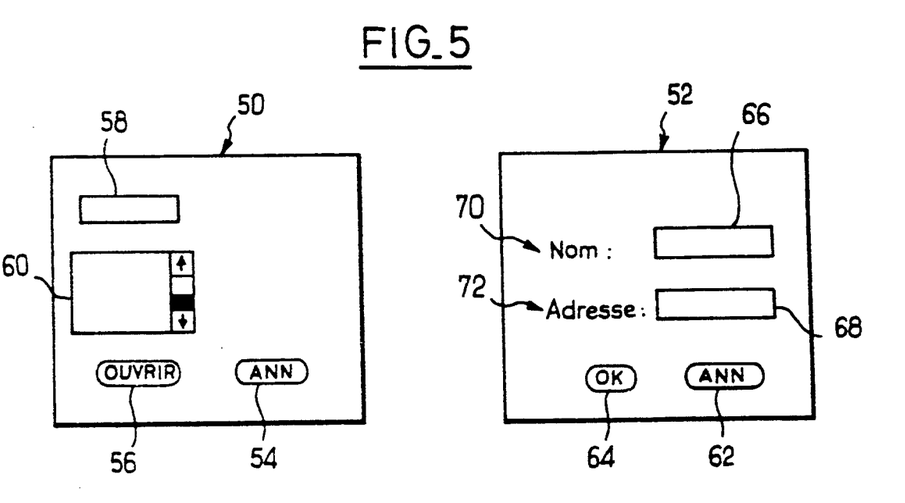
FIG. 5 shows an example of two dialog boxes incorporated in the interface of FIG. 4.

The course of creating the interface requires that two dialog boxes 50 and 52 be created, which are shown in FIG. 5 and are named "open file" and "seek address". In the mode of performing the invention given here as a non-limiting example, these dialog boxes are created by way of the special editor provided for this purpose in the MS-Windows environment. The details of this creation will not be described again here. However, the reader should avail himself of the appropriate available documentation, especially the book on MS-Windows mentioned earlier.

Once the dialog boxes have been created, they are incorporated into the interface as follows: The operator must first open the file corresponding to the interface, via the File menu of the PANORAMA menu bar, and then incorporate these dialog boxes into PANORAMA using the "cut/copy/paste" commands of the Editing menu, called up from the Survey menu. Once this operation is completed, the operator must define the various attributes of the dialog boxes. He begins by establishing the message list for each dialog box. He must also add the responses to the CONTROLS of the dialog boxes. Finally, he must associate the Response R_DIALOG-BOX with the "open" command of the FILE menu.

By way of example, the intended execution of the interface can proceed as follows. When the end user selects the command "open", the dialog box 50, "open file", is then displayed. In a list box 60, this dialog box 50 has the list of the names of persons already listed in the Address Directory. The user can then select a name in this list box 60. Once the name is selected, it appears in a text zone 58 disposed above the list box 60. The user can finally validate this choice by clicking on a button 56 labeled "OPEN" (shown as OUVRIR in FIG. 5). If the name selected exists in an external file, another dialog box 52, named "look for address", is displayed. This dialog box 52 enables the final user to consult a text zone 68 for the address associated with the selected name displayed in a text zone 66, and to make changes as needed by using the "add" and "delete" commands of the Editing menu.

The "open file" dialog box 50 has consequently been created with four CONTROLS: two of the button type, i.e., the CTL-cancel button 54 and the CTS-open button 56; one of the text zone type, i.e., CTL-edit 58, enabling the display of the name selected; and one of the CTL-ListBox type, i.e., list box 60 (enabling the display of the list of persons in the directory).

Similarly, the Address Directory dialog box 52 was created with six CONTROLS: two of the button type, i.e., the CTL-cancel button 62 (labeled ANN in FIG. 5) and the CTS-OK button 64 (labeled OK in FIG. 5); two of the text zone type, i.e., CTL-E1 66 and CTL-E2 68 (enabling the display of a name and the corresponding address); and finally, two of the static text type, i.e., CTL-addresses 72 and CTS-names 70. However, in order not to overburden the reader, only the operations relating to the open file dialog box 50 will be described here in detail.

The operator must then define the attributes of the dialog boxes, beginning with the open file dialog box. To do so, he moves to the Survey menu and selects the "dialog box" command. The corresponding survey window appears, with an Item List having two lines, each corresponding to one of the dialog boxes already created. The operator selects the open file dialog box, then in the Editing menu calls up the "new dialog box" command. This causes the display of a working window for dialog box attributes. In this window, the operator selects the modal (inhibiting) type for the dialog box, and then selects the "message list" command. Next, he enters the name of the corresponding message list, for example ML-open, and then validates his entries by clicking on the OK button.

At this stage, it should be pointed out that although the ML-open message list has been referenced, it still remains undefined. Hence, the operator should now define this list by incorporating the corresponding messages. To do so, the operator selects the Survey menu and then the "message list" command". The associated survey window then appears; the ML-open line that the operator will select is listed in the Item List (it should be noted that at this stage in the creation of the interface, the status ST of the message list ML-open is encoded as undefined or UNDEF). Selecting the ML-open message list brings about the display of the corresponding working window. By clicking on the OK button of the working window, the message list is then defined, to enable the incorporation of the messages comprising this list. To do this, the operator moves to the Expansion menu and selects the "component" command. He then moves to the Editing menu and selects the "new messge" command. A working window appears, showing the list of messages available in the MS-Windows environment. The operator chooses the message or messages he wishes and clicks on the OK button. The message selected is called WM-INITDIAL and has an associated Response List, which is empty at this stage in development. To add the Responses to this Response List, the operator moves to the Editing menu and then selects the response R_ACTION, which brings about the display of the working window "R_ACTION attributes". Into the text zone, the operator enters the name of the code of the user application function that enables selecting the names in a file and then arranging them in a list of variables, or V-LIST. Next, the operation adds the response R_SETCONTROL, to transfer the list of names in the V-LIST to the CONTROL list box (CTL-ListBox) 60 of the "open file" dialog window. To do this, the operator moves into the working window "R_ACTION attributes" and enters the name of the variable, here V-LIST, into the text zone named "initial variable", and selects the CONTROL chosen, in this case CTS-ListBox, in the list that has all the available CONTROLS. He validates this operation by clicking on the OK button of the working window "R_ACTION attributes".

This completes the description of the creation and incorporation into the interface of the first dialog box, "open file". The operator can then define and incorporate the second dialog box, "address directory", by proceeding in the same way.

The operator has now worked under the permanent control of the survey module of the PANORAMA set of programs (accessible via the Survey menu) and has always had an instantaneous synoptical table at his disposal, representing the constitution of the interface during the operation of constructing it. This synoptical table is displayed in the series of survey windows described above. If the "all classes" command of the Survey menu is called up, the synoptical table is global for the entire interface. Contrarily, if a particular command, such as "window", is called up in the Survey menu, the synoptical table can be made to display only a detailed portion of the interface.

It should be noted that in the foregoing description, reference has always been made to making a selection on the screen by using the mouse. It will be understood that without departing from the scope of the invention, the operator can make these selections directly from the keyboard, or by using predefined "speedup" keys on the keyboard.

Once the creation of his interface has been completed, the operator is in a position to save it under a certain file name. He can then call up this interface, either simply to consult it or to make changes. In particular, he can use the "Attributes" command of the Editing menu (by entering that menu from the Survey menu) to cause the various working windows to appear that correspond to the Attributes of the components selected in the Item Lists and Response Lists. He can thus modify the attributes of the constituent elements of the interface as he wishes. Moreover, the operator has the option of creating new elements, including Conditions, or eliminating elements (with the "cut/copy/paste" command of the Editing menu). It should be noted that all these modifications are made under the permanent control of the survey module and are displayed in the appropriate survey windows.

From the standpoint of program structure, the PANORAMA set includes a module called Resource Controller, which is capable of managing, first, the inputs/outputs of PANORAMA to resource files stored independently in memory (these files include among other things the memorized versions of the interfaces created via PANORAMA), and second, the communications of a PANORAMA-created interface with the user applications. In particular, the Resource Controller coordinates the creation of items of the interface in the central memory, from the descriptions contained in the resource files of the MS-Windows environment and of the PANORAMA set, and organizes the dynamic management of the dialogs between the MS-Windows environment, the interface, and the user application.

In an advantageous characteristic of the invention, the Resource Controller enables the autonomous utilization (dynamic execution) of the interface, whether in association with the user application or not, independently of the survey and editing modules of the PANORAMA set. It is thus possible to clear the central memory of these latter modules and free up a large proportion of the memory space used by PANORAMA. This reduced configuration is especially well adapted to a use of the interface by an end user, who unlike the developer has no real need to modify the interface with which he is working.

What is claimed is:

1. A method of generating interfaces for user applications, each of the interfaces being structured about a window displayable on the screen of a data processing system operating in the graphics mode, and interface including visual or dynamic items, the method comprising:

displaying, in at least one survey window (16) of a survey module, an instantaneous synoptical table (18, 20) representing the constitution of an interface and composed on the basis of a descriptive status of the visual or dynamic items (22) present in the interface, said synoptical table being displayed in the form of at least one item list (18) having items accompanied by at least one list of responses (20) which itemizes the responses associated with a currently selected item (22) in the item list (18), and creating or modifying, in an interactive mode, said items (22) with the aid of at least one working window (29) under the control of the survey module, said at least one working window providing item selection and editing capabilities in said interactive mode.

2. The method of claim 1, characterized in that in the interactive mode, with the aid of at least one working window (29) under control of said survey module, the creation or modification of specific reactions associated with said items (22), hereinafter called responses, is performed, on the basis of actions predefined outside the interface with a callup of an identifiable function of the user application.

3. The method of one of claim 2 characterized in that in the interactive mode, with the aid of at least one working window under the control of said survey module, the creation or modification of said at least one item list is performed, by pooling of the responses associated with the same items in ordered fashion for sequential execution, wherein certain item lists, hereinafter called Named Response Lists, are more identifiable and are capable of being called up from inside or outside the interface, and other item lists, hereinafter called Response Lists, are less identifiable than the Named Response Lists.

4. The method of claim 3, characterized in that in the interactive mode, the creation or modification of at least one particular Names Response List, hereinafter called the Initial Status, is performed, with the aid of a working window under control of said survey module, the Initial Status Response Lists for execution at the time a user application linked with said interface is initialized.

5. The method of claim 3, characterized in that the interactive mode, with the aid of a working window under the control of said survey module, the creation or modification of conditional branch Responses, hereinafter called Conditions, is performed, each Condition including a branch identifier used to call up a Names Response List.

6. The method of one of claim 5, characterized in that in the interactive mode, with the aid of a working window under the control of said survey module, the creation or modification of reference callup functions is performed, each Reference being linked to one Response and being capable of calling up an identifiable item of the interface.

7. The method of one of claim 6, characterized in that the synoptical table is organized by category (or class) of items in a plurality of Item Lists (18), each Item List corresponding to a predetermined class and being displayable separately, as application accompanied by its Response List, each Item List (18) or Response List (20), organized by the type of constituent elements of the interface, displaying a set of descriptive rubrics for each item or component of an item and/or Response, the rubrics being selected in particular from the following: "class/type", "name", "attribute", "item status", and "reference callup", the contents of the Item Lists and Response Lists and in particular the contents of the descriptive rubrics being updated automatically from the working windows progressively with the operations of creation or modification of the interface in the interactive mode.

8. The method of claim 7, characterized in that the synoptical table further includes at least one list of conditions, or Conditions List (26), displayable in a survey window after callup based on a selection in a Response List.

9. The method of claim 3, characterized in that in the interactive mode, with the aid of at least one working window under the control of said survey module, the creation or modification of Response Lists is performed, by pooling of the Responses associated with the same items in ordered fashion for sequential execution, wherein certain Response Lists, hereinafter called Named Response Lists, are more identifiable and are capable of being called up from inside and/or outside the interface.

10. The method of claim 2, characterized in that said synoptical table is displayed in at least one survey window (16) in the form of at least one list having items, called an Item List (18), accompanied as applicable by at least one list of Responses, or Response List (20), and further includes itemizing the Responses associated with the currently selected item (22) in the Item List (18).

11. The method of claim 10, characterized in that in the interactive mode, with the aid of at least one working window under the control of said survey module, the creation or modification of Response Lists is performed, by pooling of the Responses associated with the same items in ordered fashion for sequential execution, wherein certain Response Lists, hereinafter called Named Response Lists, are more identifiable and are capable of being called up from inside and/or outside the interface.

12. The method of claim 1, characterized in that the interface to be generated is broken down into basic constituent elements, such as said items or components thereof, by categories of predefined identical structure; the synoptical table is organized in such a manner as to identify each constituent element or its category; and defining for at least one category, at least one working window (29), preferably a dialog window, that is capable of being called up from the survey module, either in the element creation mode after identification of the category in question, or in the display/modification mode after identification of the particular constituent element.

13. The method of claim 12, characterized in that said working windows are pooled in an editing module controlled by the survey module, said editing module further including a module for block information exchange of said constituent elements, of the cut/copy/paste type, and capable of determining the format of the current block from the identification of the category of the constituent element to be manipulated.

14. The method of claim 13 characterized in that the categories of the constituent elements are chosen from among known types of items, such as window, menu bar, dialog box, message box, components of items such as menus, buttons, or on the basis of reactions associated with the items, conditional branch reactions, and call-ups of items of the interface made via these reactions.

15. The method of claim 12, characterized in that the categories of the constituent elements are chosen from among known types of items, such as window, menu bar, dialog box, message box, components of items such as menus, buttons, or on the basis of reactions associated with the items, conditional branch reactions, and call-ups of items of the interface made via these reactions.

16. The method of claim 1, characterized in that a test module is associated with the interface, the test module being capable of effecting the display of all or part of the interface or of dynamic execution of all or part of the interface progressively with its creation or modification in order to display the behavior of the interface and/or of the user application.

17. The method of claim 1, characterized in that in the interactive mode with the aid of at least one working window (29) under control of said survey module, the creation and modification of specific reactions associated with said items (22) hereinafter called Responses, is performed, on the basis of actions predefined inside the interface.

18. The method as set forth in claim 1 wherein among the dynamic items of the interface there is included a response R_ACTION that enables execution of a subroutine which exists in a user application.

19. The method as set forth in claim 1 wherein among the dynamic items of the interface there is includes a response R_BEEP for producing a sound used particularly for warning an end user.

20. The method as set forth in claim 1 wherein among the dynamic items of the interface there is includes a response R_CTLSTATUS for modifying the status of a CONTROL.

21. The method as set forth in claim 1 wherein among the dynamic items of the interface there is included a response R_DIALOGBOX for opening and initializing a dialog box.

22. The method as set forth in claim 1 wherein among the dynamic items of the interface there is included a response R_ENDDIALOG for closing a dialog box and entering a return code.

23. The method as set forth in claim 1 wherein among the dynamic items of the interface there is included a response R_EXIT for exiting a list of responses within which said R_EXIT response is included.

24. The method as set forth in claim 1 wherein among the dynamic items of the interface there is included a response R_FORWARD which enables forwarding information from one CONTROL to another CONTROL in a same dialog box.

25. The method as set forth in claim 1 wherein among the dynamic items of the interface there is included a response R_ITEMSTATUS which enables modifying the execution status of a menu choice.

26. The method as set forth in claim 1 wherein among the dynamic items of the interface there is included a response R_MENUBAR for dynamically associating a particular menu bar with a given window.

27. The method as set forth in claim 1 wherein among the dynamic items of the interface there is included a response R_MESSAGEBOX for opening a message box to inform the end user of an act via the contents of a message.

28. The method as set forth in claim 1 wherein among the dynamic items of the interface there is included a response R_SELECT for placing an active point on a given CONTROL of a dialog box.

29. The method as set forth in claim 1 wherein among the dynamic items of the interface there is included a response R_SETCONTROL for giving a CONTROL the contents of a variable.

30. The method as set forth in claim 1 wherein among the dynamic items of the interface there is included a response R_SETVARIABLE for saving the contents of a CONTROL in a variable.

31. The method as set forth in claim 1 wherein among the dynamic items of the interface there is included a response R_WINDOW for performing an operation on a given window.

32. The method of claim 1, wherein said survey module comprises a survey menu which enables the selection of a class of elements to be displayed in the survey window with which a user may work.

33. The method of claim 1, further comprising breaking down said interface to be generated into a plurality of categories of predefined identical structure having a plurality of basic constituent elements such as said items or components of said items, into categories of predefined identical structure, said categories of constituent elements being chosen from among known types of items including window, menu bar, dialog box, message box and components of items including menu buttons, check box, radio button, list box, text, text zone, horizontal scrolling bar and vertical scrolling bar.

34. The method of claim 1 wherein said survey module further comprises an editing menu which comprises three groups of commands, a first group having the commands "Cut", "Copy", and "Paste", a second group containing the command "Attributes", which upon selection, opens a working window which has the attributes of a current element selected from the list displayed in the survey window, and a third group of commands having variable contents which vary depending upon the manner in which the editing menu has been entered.

35. The method of claim 34 wherein said survey module includes a survey menu which enables the selection of a class of elements to be displayed in the survey window, and wherein said third group of commands contains the commands "new menu bar", "new menu", "new menu choice", "new responses" and "new condition" when the editing menu is entered from a "menu bar" class of the survey menu.

36. The method of claim 34 wherein said survey module includes a survey menu which enables the selection of a class of elements to be displayed in the survey window, and wherein said third group of commands contains the commands "new named response list", "new response", and "new condition" when the editing menu is entered from a "named response list" class of the survey menu.

37. The method of claim 34 wherein said survey module includes a survey menu which enables the selection of a class of elements to be displayed in the survey window, and wherein said third group of commands contains the commands "new message list", "new message", "new response" and "new condition", when the editing menu is entered from a "message list" class of the survey menu.

38. The method of claim 34 wherein said survey module includes a survey menu which enables the selection of a class of elements to be displayed in the survey window, and wherein said third group of commands contains the command "new message box" when the editing menu is entered from a "message box" class of the survey menu.

39. The method of claim 34 wherein said survey module includes a survey menu which enables the selection of a class of elements to be displayed in the survey window, and wherein said third group of commands contains the commands "new response" and "new condition" when the editing menu is entered from an "initial status" class of the survey menu.

40. The method of claim 34 wherein said survey module includes a survey menu which enables the selection of a class of elements to be displayed in the survey window, and wherein said third group of commands contains the command "new variable" when the editing menu is entered from a "variable" class.

41. The method of claim 34 wherein said survey module includes a survey menu which enables the selection of a class of elements to be displayed in the survey window, and wherein said third group of commands contains a "new window" command when said editing menu is entered from a "window" class of the survey.

42. The method of claim 34 wherein said survey module includes a survey menu which enables the selection of a class of elements to be displayed in the survey window, and wherein said third group of commands contains the commands "new dialog box", "new response" and "new conditions" when said editing menu is entered from a "dialog box" class of the survey menu.

43. The method of claim 1 wherein the survey module also comprises an expansion menu enabling a user to work with subportions of the synoptical table.

44. The method of claim 43 wherein said expansion menu is designed to allow, when entered through a dialog box command of the survey menu, the selection of one of the components of a dialog box.

45. Apparatus for generating interfaces, said apparatus including a data processing system having a central processing unit, a central memory loaded with an operating system program, a screen working in the graphics mode, at least one input peripheral capable of moving a pointer from place to place on the screen, the apparatus further comprising a set of programs operatively associated with the system for displaying on the screen, in at least one survey window of a survey module, a synoptical table representing the constitution of at least a part of the interface and composed on the basis of a descriptive status of the visual or dynamic items (22) present in the interface and for creating or modifying, in an interactive mode, said items (22), with the aid of at least one working window under the control of the survey module, wherein said at least one working window provides item selection and editing capabilities in said interactive mode.

46. The apparatus of claim 45, characterized in that said set of programs includes an autonomous interface operating module, arranged to be capable of being associated with the generated interface independently of said survey module and if applicable of said editing module, in order to enable the dynamic execution of this interface with a user application.

47. The apparatus of claim 45, characterized in that in the interactive mode, with the aid of at least one working window (29) under the control of said survey module, there is included means for the creation or modification of the specific reactions associated with said items (22), hereinafter called Response, on the basis of actions predefined inside or outside the interface, and when outside the interface with a callup of an identifiable function of the user application.

48. The apparatus of claim 47, wherein the interface is broken down into basic constituent elements by categories of predefined identical structure, the synoptical table is organized in such a manner as to identify each constituent element or its category, for at least one category, at least one working window (29) is defined that is capable of being called up from the survey module, either in an element creation mode after identification of the category in question, or in a display/modification mode after identification of the particular constituent element.

49. The apparatus of claim 45 further including a test module means operatively associated with the interface for effecting the display of all or part of the interface or of dynamic execution of all or part of the interface progressively with its creation or modification in order to display the behavior of the interface or of the user application.

* * * * *

UNITED STATES PATENT AND TRADEMARK OFFICE
CERTIFICATE OF CORRECTION

PATENT NO. : 5,297,250
DATED : March 22, 1994
INVENTOR(S) : LEROY et al

It is certified that error appears in the above-indentified patent and that said Letters Patent is hereby corrected as shown below:

Col. 22, line 34 (Claim 1, line 4) "and interface" should be --said interface--.

Col. 23, line 12 (Claim 5, line 1) "in that the" should be --in that in the--.

Col. 23, line 17 (Claim 5, line 6) "Names" should be --Named--.

Col. 24, line 29 (Claim 14, line 1) "claim 13 characterized" should be --claim 13, characterized--.

Col. 24, line 62 (Claim 19, line 2) "includes" should be --included--.

Col. 24, line 66 (Claim 20, line 2) "includes" should be --included--.

Signed and Sealed this

Twenty-first Day of March, 1995

Attest:

BRUCE LEHMAN

Attesting Officer    Commissioner of Patents and Trademarks